United States Patent Office 3,201,194
Patented Aug. 17, 1965

3,201,194
PROCESS FOR PREPARATION OF COPPER
AMMONIUM PHOSPHATE
Murrell L. Salutsky, Silver Spring, Md., assignor to W. R.
Grace & Co., New York, N.Y., a corporation of
Connecticut
No Drawing. Filed Dec. 17, 1964, Ser. No. 419,229
3 Claims. (Cl. 23—105)

This a continuation-in-part of my copending application Serial No. 170,815, filed February 2, 1962, now abandoned.

This is a continuation-in-part of my copending application it relates to an improved method for the preparation of copper ammonium phosphate which is a trace element fertilizer material.

In summary, this invention is directed to a process for preparing a trace element fertilizer material consisting essentially of substantially pure crystalline copper ammonium phosphate monohydrate in a yield of about 97% of theory which comprises: (a) mixing an aqueous solution of a tetramminecopper (II) compound and an aqueous solution of ammonium phosphate, said ammonium phosphate solution having a mole ratio of ammonium ion to phosphate ion of about 1.5–3, in such proportions that the mole ratio of phosphate to copper in the resulting mixture is about 1–1.1, and maintaining the temperature, during mixing, below about 20° C.; (b) heating said resulting mixture to about 25–100° C. for about 4 hours to about 3 days to evolve ammonia from said mixture until the pH of said mixture is reduced to about 6–7, thereby precipitating crystalline copper ammonium phosphate; (c) recovering the copper ammonium phosphate product, washing said product with water, and drying said product at about 100° C.

As used in this specification, the term "phosphoric acid" means orthophosphoric acid, the term "phosphate" means orthophosphate, and the term "copper," when used in the expressions "copper salt," copper salts," "compounds of copper," "copper sulfate," "copper chloride," "tetramminecopper compound," and the like refers to divalent copper (i.e., copper (II)). In other words, oxidation state of copper in all compounds of said element mentioned in this specification is positive two (+2). The term "copper ammonium phosphate" as used herein means copper (II) ammonium orthophosphate monohydrate ($CuNH_4PO_4 \cdot H_2O$). The term "percent" ("%") as used in this specification means percent by weight.

Copper ammonium phosphate monohydrate,

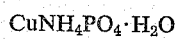

$$CuNH_4PO_4 \cdot H_2O$$

has found utility as a component of fertilizer compositions—particularly non-burning fertilizer compositions. Its use, has, however, been substantially deterred due to the great amount of time required to prepare this compound in accordance with the known methods and the consequent high cost of the product. One of these prior methods involves the addition of phosphoric acid to an aqueous solution of a soluble copper salt, such as copper sulfate or copper chloride, followed by neutralization of the solution with ammonia either as a gas or in aqueous solution. In another known method ammonium phosphate, either as a solid or in aqueous solution, is added to and reacted with an aqueous solution of a copper salt, e.g., copper sulfate. In each of these prior methods tricopper phosphate, $Cu_3(PO_4)_2 \cdot 3H_2O$, is formed as an intermediate, which, as is well known to those skilled in the art, is not satisfactory for use as a component of non-burning fertilizer compositions. Since this intermediate has a very low water solubility (cf. Handbok of Chemistry and Physics, Chemical Rubber Publishing Co., 31st edition (1949), pp. 438–439) it is necessary to digest the reacting solution for periods of time ranging from 6 to 10 days in order to recover the desired copper ammonium phosphate in any significant yield, and the thus produced copper ammonium phosphate is not substantially pure.

It is an object of this invention to provide an improved method for the preparation of substantially pure crystalline copper ammonium phosphate in high yields. It is another object of this invention to provide a process for the preparation of copper ammonium phosphate which does not require long digestion times and in which the product can be recovered in substantially complete yields in a relatively short period of time, on the order of several hours to two to three days. Other objects of this invention will be apparent to those skilled in the art in view of the detailed description which follows.

It has been found that the above objects of this invention can be fulfilled by mixing an aqueous solution of a tetramminecopper (II) compound (e.g., $Cu(NH_3)_4SO_4$ or $Cu(NH_3)_4(OH)_2$) with an aqueous solution of ammonium phosphate in such proportions that the pH of the resulting mixture is in the range of from about 8 to about 10, preferably from about 9 to about 10, while maintaining the temperature of the reactants and the resulting mixture below about 20° C. (to minimize the vaporization of ammonia therefrom during mixing), subsequently heating the mixture to a temperature sufficient to evolve ammonia therefrom, and continuing said heating until the pH of the admixture is lowered to at least below about 7 (preferably to within the range of from about 6 to about 7) by vaporizing ammonia from the system. (If substantial quantities of ammonia are vaporized from the system during mixing, tricopper phosphate can be precipitated.)

It is possible to prepare substantially pure copper ammonium phosphate by mixing an aqueous solution of a tetramminecopper (II) salt with an aqueous solution of phosphoric acid; however, I have found that this method is impractical for producing the desired copper ammonium phosphate in substantially pure form, except where working with small quantities (e.g., where using a few hundred grams of phosphoric acid as a starting material) in the laboratory. When working with larger quantities localized regions in the reacting mixture can be very acidic (especially if agitation is inadequate or improper), thereby causing the precipitation of various insoluble copper compounds which reduces both the purity and the yield of the desired copper ammonium phosphate product.

The aqueous solution of a tetramminecopper (II) salt can be prepared by several methods such as those described in, e.g., Kirk-Othmer, Encyclopedia of Chemical Technology, vol. 4, (1954), p. 479. The preferred method is by treating an aqueous solution of a copper salt, for example, copper sulfate, copper chloride, copper nitrate, copper acetate, or the like, with sufficient amounts of ammonia. Said ammonia can be added as aqueous ammonia, as anhydrous liquid ammonia, or as ammonia vapor, to form the desired tetramminecopper (II) compound. The formation of tetramminecopper (II) compound is readily indicated by a change in color of the ammoniated copper compound solution to a deep blue or blue-green shade. The concentration of this solution is not critical, the basic criterion being the complete solution of all copper compounds contained therein.

The tetramminecopper (II) compound solution can be reacted with an ammonium phosphate solution which can be readily prepared by the ammoniation of an aqueous phosphoric acid solution with liquid anhydrous ammonia, ammonia vapor, or aqueous ammonia. The concentration of the resulting phosphate solution is not critical, the basic criterion being the complete solution of all of the thus produced ammonium phosphate. Said ammonium phosphate can be any ammonium phosphate or mixture of ammonium phosphates having a mole ratio of ammonium ion to phosphate ion $$(NH_4^+ : PO_4^{---})$$

of about 1–3; however, I prefer said ratio to be about 1.5–3, and I have obtained excellent results when said ratio is about 2–3.

Following the procedure of Example I will provide a pH of from about 8 to about 10 in the resulting mixture. The mole ratio of phosphate to copper in said resulting mixture must be at least about one, and, although an excess of phosphate ions can be used, it is preferable to maintain said ratio at about 1–1.1 to avoid the loss of valuable phosphate values.

If the reacting solutions (i.e., the solution of a tetramminecopper (II) compound and the ammonium phosphate solution) are mixed in an open or vented reactor the temperature should be maintained below 20° C. in order to avoid any preliminary volatilization of ammonia from the admixture which can result in the precipitation of undesired tricopper phosphate. However, as is readily apparent to those skilled in the art, when conducting the process of this invention in a pressure vessel, higher temperatures (e.g., up to about 50–60° C.) can be used. I prefer to stir or otherwise agitate the reaction mixture which is formed by admixing said reacting soultions because agitation facilitates mixing and results in the formation of a purer product.

The precipitation of crystalline copper ammonium phosphate does not occur until the reaction mixture (i.e., the mixture of the solution of tetramminecopper (II) compound and the ammonium phosphate solution) is heated in an open or vented reactor to evolve ammonia vapor therefrom. Heating can be performed in any suitable manner. The temperature to which the reaction mixture is heated can be within the range of from about 25° C. to about 100° C. At the lower temperatures in this range the evolution of ammonia will, of course, be at a slower rate, and the time required to lower the pH of said reaction mixture to the necessary range will thus be much longer. At the higher temperatures evolution is much more rapid, but care must be exercized to avoid volatilization of undue amounts of water from said mixture. It is generally preferred for best overall results to heat to temperatures within the range of from about 50° C. to about 75° C.

As heating continues, the evolution of ammonia causes a gradual decrease in the pH of said reaction mixture. When sufficient ammonia has been evolved to lower the pH to at least about 7, and preferably to within the range of from about 6 to about 7, copper ammonium phosphate monohydrate in the form of blue crystals is precipitated. The time required is generally between about 4 hours and about 3 days. When heating is contucted at temperatures in the preferred range of from about 50° C. to about 75° C., the time required for completion of the process is between about 6 and about 12 hours.

The crystalline copper ammonium phosphate monohydrate product can be recovered by any conventional method, such as by filtration, decantation, centrifugation and the like. Usually the product is washed with water and dried before packaging or use.

A considerable savings in cost of performing the process described above can be made by recycling evolved ammonia for use in preparing more copper ammonium phosphate. Means for recovering and recycling ammonia will be obvious to those skilled in the art and thus need not be described herein.

The invention will be further understood by referring to the following specific examples. These examples are intended to be illustrative only and should not be construed as limiting the invention in any manner.

*Example I*

To a solution of 291.3 g. of copper sulfate pentahydrate ($CuSO_4 \cdot 5H_2O$) in one liter of water there was added 320 ml. of a 28% aqueous ammonia solution to form an aqueous solution of tetramminecopper (II) sulfate. The solution had a deep blue color. In a separate vessel a solution of phosphoric acid was prepared by diluting 134.5 g. of 85% phosphoric acid with one liter of water. To this phosphoric acid solution there was added 236 ml. of a 28% aqueous ammonia solution to form a solution of ammonium phosphate. Said aqueous solution of tetramminecopper (II) sulfate and said solution of ammonium phosphate were mixed while maintaining the temperature of the reactants and the resulting mixture below about 20° C. The pH of said resulting mixture was within the range of 9–10. The mixture was heated to temperatures between about 60° and 70° C. and stirred. Air was blown over the surface of the admixture to assist in removing the evolved gaseous ammonia. These conditions were maintained for about six hours after which sufficient ammonia had been evolved to lower the pH of the reacting solution to about 6, thereby to precipitate crystalline copper ammonium phosphate monohydrate product. Said copper ammonium phosphate monohydrate was filtered out of the solution, washed with water, and dried in a warm air circulating oven at about 100° C. The dried product weighed 221 g., representing an approximate yield of 97%.

X-ray diffraction pattern analysis showed that the recovered product was substantially pure copper ammonium phosphate monohydrate of the formula $CuNH_4PO_4 \cdot H_2O$. Elemental analysis of the product gave the following results:

|  | Found | Theoretical |
| --- | --- | --- |
| Nitrogen | 6.94 | 7.20 |
| Copper | 33.26 | 32.66 |
| $P_2O_5$ | 36.20 | 26.48 |

The product contained 36.16 percent by weight available $P_2O_5$ and thus was eminently suited for fertilizer uses.

*Example II*

Solutions of ammonium phosphate and tetramminecopper (II) sulfate were prepared and admixed in exactly the same manner as described in Example I. The admixture was heated at 40° C. for about 24 hours and then permitted to age for about three days at a temperature of about 25° centigrade after which a dense, blue, crystalline precipitate was filtered therefrom.

X-ray diffraction pattern analysis of the recovered precipitate showed that it was substantially pure copper ammonium phosphate monohydrate, $CuNH_4PO_4 \cdot H_2O$. Elemental analysis of the product gave the following results

|  | Found | Theoretical |
| --- | --- | --- |
| Nitrogen | 7.24 | 7.20 |
| Copper | 32.20 | 32.66 |
| $P_2O_5$ | 36.50 | 36.48 |

The product of each of Examples I and II was suitable for use as an ingredient in fertilizer compositions.

*Example III*

The general procedure of Example I was repeated; however, in this instance the ammonium phosphate solution was prepared by adding 134.5 g. of 85% phosphoric acid to a liter of water and adding 118 ml. of 28% aqueous ammonia solution to the diluted acid.

The washed and dried product weighed 223 g., and analysis showed that said product was substantially pure copper ammonium phosphate.

Example IV

The general procedure of Example I was repeated; however, in this instance the ammonium phosphate solution was prepared by adding 134.5 g. of 85% phosphoric acid to a liter of water and adding 158 ml. of 28% aqueous ammonia solution to the diluted acid.

The washed and dried product weighed 119 g., and analysis showed that said product was substantially pure copper ammonium phosphate.

Example V

During several attempts to prepare essentially pure copper ammonium phosphate monohydrate, ammonia was added to systems consisting of copper (II) salts (which are soluble in phosphoric acid), water, and phosphoric acid (at least stoichiometrically equivalent to the copper (II) ions present). In each case a substantial amount of precipitate resulted when ammonia was added to bring the pH to about 7–9. Analysis (X-ray and chemical) showed that each precipitate was a mixture having $Cu_3(PO_4)_2 \cdot 3H_2O$ as its principal constituent. After each mixture had digested at about 25° C. for about 8 hours, a small quantity of copper ammonium phosphate monohydrate could usually be detected in the thus treated precipitate. On further digestion the relative quantity of copper ammonium phosphate monohydrate present increased progressively with time. Depending upon batch size, substantially all of said precipitate was converted to copper (II) ammonium phosphate monohydrate after digestion for about 6–14 days at about pH 7–9.

Example VI

A solution of copper (II) chloride was made by dissolving 170.5 g. of $CuCl_2 \cdot 2H_2O$ in one liter of water. This solution was designated "Solution M."

A solution of sodium ammonium hydrogen phosphate was prepared by dissolving 209.1 g. of $$NaNH_4HPO_4 \cdot 4H_2O$$

in a liter of water. The resulting solution was designated "Solution S."

A solution of ammonium chloride was made by dissolving 200 g. of $NH_4Cl$ in a liter of water. The resulting solution was designated "Solution C."

The following materials, at about 25° C. were added (in the order listed) to a flask:

| | Ml. |
|---|---|
| Water | 100 |
| Solution M | 25 |
| Solution C | 25 |
| Aqua ammonia, 28% $NH_3$ | 4 |
| Solution S | 25 |

The flask was then stoppered and shaken to mix the reactants for several (ca. 8–10) minutes. The temperature of the reaction mixture did not exceed about 25° C. The resulting slurry was removed from the flask, separated by centrifuging, and the recovered precipitate was washed with water (by suspending the solid product in water and centrifuging in the manner usually used to wash precipitates) until the wash water no longer gave positive tests for chloride and phosphate ions (silver nitrate and molybdate tests, respectively). The washed product was recovered, dried overnight at about 83° C., and analyzed. Analysis showed that said product contained less than about 20% of copper ammonium phosphate.

Example VII

The general procedure of Example VI was repeated, but in this instance Solution C ($NH_4Cl$) was omitted. The results of this run were substantially identical to those obtained in Example VI.

I claim:

1. Process for preparing a trace element fertilizer material consisting essentially of substantially pure crystalline copper ammonium phosphate monohydrate in a yield of about 97% of theory which comprises:
    (a) Mixing an aqueous solution of a tetramminecopper (II) compound and an aqueous solution of ammonium phosphate, said ammonium phosphate solution having a mole ratio of ammonium ion to phosphate ion of about 1.5–3, in such proportions that the mole ratio of phosphate to copper in the resulting mixture is about 1–1.1, and maintaining the temperature, during mixing, below about 20° C.;
    (b) Heating said resulting mixture to about 25–100° C. for about 4 hours to about 3 days to evolve ammonia from said mixture until the pH of said mixture is reduced to about 6–7, thereby precipitating crystalline copper ammonium phosphate.
    (c) Recovering the copper ammonium phosphate product, washing said product with water, and drying said product at about 100° C.

2. The process of claim 1 in which said resulting mixture is heated at about 50–75° C. for about 6–12 hours to evolve ammonia from said mixture until the pH of said mixture is reduced to about 6–7, thereby precipitating crystalline copper ammonium phosphate.

3. The process of claim 1 in which the mole ratio of ammonium ions to phosphate ions in the ammonium phosphate solution is about 2–3.

References Cited by the Examiner

UNITED STATES PATENTS 2,363,570  11/44  Caprio _____ 23—105 X

FOREIGN PATENTS 492,596  9/38  Great Britain.
629,654  9/49  Great Britain.

OTHER REFERENCES

Jacobson: "Encyclopedia of Chemical Reactions," vol. 4. Reinhold Publi. Corp., N.Y., 1951, p. 427.

MAURICE A. BRINDISI, *Primary Examiner.*